UNITED STATES PATENT OFFICE.

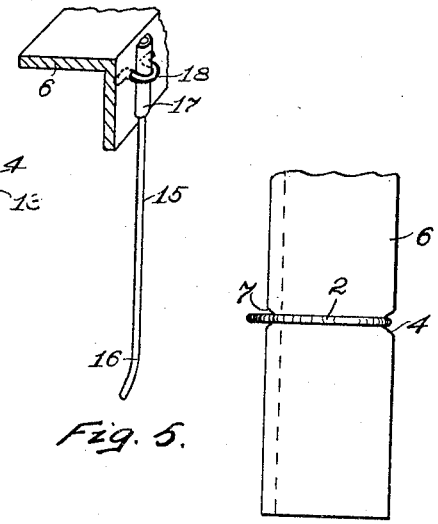

DANIEL H. YOUNG, OF MANCHESTER, IOWA.

FORM AND ATTACHMENT FOR CULTIVATOR-TEETH.

1,112,045.  Specification of Letters Patent.  Patented Sept. 29, 1914.

Application filed May 6, 1913. Serial No. 765,814.

*To all whom it may concern:*

Be it known that I, DANIEL H. YOUNG, a citizen of the United States of America, and a resident of Manchester, Delaware county, Iowa, have invented certain new and useful Improvements in Forms and Attachments of Cultivator-Teeth, of which the following is a specification.

My invention relates to improvements in the construction and attachment of cultivator teeth, and my object is to form such teeth of elastic material such as resilient wire, which, when detachably secured to a supporting structure, will, when in use and under a forward tension, curve or bend to an inclined position rearwardly, to permit them to drag upon and scratch the soil instead of digging into it, thus facilitating the pulverization of the soil without at the same time plowing it up or on the other hand raking up and carrying forward masses of sod, sticks, stalks or other materials or refuse, and also preventing the uprooting of corn while moving therethrough. This object I have accomplished by the means which are hereinafter described and claimed, and which are illustrated in the accompanying drawings, in which:

Figure 1 is a transverse section of a supporting angle-bar, part of a cultivator structure, to which is detachably connected the wire tooth 1 by means of its hook-shaped head 2. Fig. 2 is an upper plan view of the parts shown in said Fig. 1. Fig. 3 is a similar view of said parts to that given in Fig. 1, but, however, showing the body of the tooth under tension as in use proceeding forwardly through the soil, and curving elastically backward. Fig. 4 is a transverse section of a supporting angle-bar, showing detachably connected thereto, a slightly varied form of elastic cultivator tooth. Fig. 5 is a perspective view of a spring-tooth clamped at its upper end to a supporting-body. Fig. 6 is a perspective view of a tooth and its support like that shown in Fig. 1, but having a varied form of resilient connection between said parts. Fig. 7 is an elevation of a rigid tooth resiliently connected to a supporting body. Fig. 8 is a perspective view of a spring-tooth with its resilient connection to a supporting body, the tooth being rearwardly bent in offset curves.

Similar numerals of reference denote corresponding parts throughout the several views.

The tooth is formed of spring wire, and its body 1 is normally hung vertically from a supporting angle-bar 6 of the cultivator-frame, being straight when not under tension, as when in use. The head 2 of the tooth has the form of a hook, and lies in engagement with the said angle-bar at three points, lying in the three V-shaped notches 4, 5 and 7, which are located on the edges of the bar and on its outer angle. The forward bend or offset part 13 of the hook engages the forward notch 4, while the terminal bent-over end 3 of the hook is seated in the notch 5, and since the space between the terminal 3 and the body 1 of the hook is less than the general width of the hook, the hook is securely held in place on said angle-bar. The V-shaped notches permit wire of different sizes to be employed for such spring-teeth, while always fitting them without side-play. The hook 2 is easily sprung over the bar 6 to secure it in said notches, by merely springing the terminal part 3 away sufficiently, allowing it to react to engage itself about the bar. The hook is detached by reversing said process. In Fig. 1, I have shown the body 1 of the tooth secured by means of a coiled spring 8 to the vertical part of the angle-bar 6 in a transverse orifice in the same. This spring serves alternately as a tension or a compression-spring, depending upon whether the cultivator is being moved forward or backwardly, and the spring 8 therefore in both actions of the cultivator serves to reinforce the spring-tooth 1 at its offset part 13 at which occurs the most torsion in use and the most liability to bending or breaking.

The device shown in Fig. 4, is that of a spring-tooth 9, which is used in an identical manner to that above described, but whose manner of attachment to the angle-bar is slightly variant, but yet coming within the scope and principle of my invention. In this form, the tooth-body 1 also depends straightly from the angle-bar 4, but the bar is reversed in its position to have its vertical part forward of its horizontal part, while the latter is perforated near its angle at 12 to seat the depending part 10 of the tooth, bent at 14, with the terminal 11 hooked over the lower edge of the vertical part of the bar in its V-shaped notch 5. This latter form of tooth is readily attached and detached, and is used in the same way, having the same attribute of resiliently bending in an inclined way backwardly when in use only, so as to override obstacles without damage, while also efficiently stirring the soil to thoroughly pulverize it.

In Fig. 5 I have shown a spring tooth 15, bent slightly rearwardly at its lower end 16, said tooth being secured to the angle-bar 6 to depend therefrom normally vertically. Said tooth 15 is straight throughout except for its bent lower end 16, and its upper end has a semi-cylindrical piece 17 fitted thereover, both said tooth and its inclosed piece 17 being secured to the vertical part of said angle-bar 6 by means of a staple 18. The slight rearward bend 16 in said tooth causes it to drag over obstacles or through tops of corn stalks without tearing them up.

In Fig. 6 I have illustrated the spring tooth device of a similar type to that shown in Fig. 1, the tooth 26 being somewhat curved toward the rear, while the spring head is resiliently connected to the vertical part of the angle-bar 6 by means of a spring device 23. The device 23 is formed from a piece of spring wire bent medially to form an eye or loop 24 adapted to inclose the tooth 22, the members of said device being spread apart from each other as shown, then brought together near their ends, passed through an orifice in the angle-bar with their extremities bent outwardly and lying upon the angle-bar. This device is very simple, easily connected and replaced.

In Fig. 7 I have shown the variation wherein the straight and rigid tooth 19 is resiliently connected to the angle-bar 6 by means of a connecting spring-member 20, which latter has one end secured to the horizontal part of said angle-bar by means of a rivet 21, then bent downwardly and rearwardly under said angle-bar to have its other extremity secured to the head of said rigid tooth 19. In this form of my device, the same result is obtained as with the others shown therein, for the rigid tooth 19 in dragging through the soil during forward progression, because of said resilient connection will incline rearwardly in action.

In Fig. 8 I have shown a construction like that illustrated in Fig. 6, with this difference, that the body of the tooth 26 is bent in a general rearward direction to have offset curves 27, which curved form of the tooth adds considerable resiliency thereto in its dragging action upon and through soil while progressing forwardly.

My invention therefore consists in the use of a spring tooth, or a tooth so formed and supported as to drag yieldingly while progressing forwardly so as to scratch the soil to stir it up without actually digging thereinto to tear up the stalks of corn or other plants being cultivated, or breaking up various bodies met with, as would be the case with the forwardly directed teeth of a rake of an ordinary type, or rigid or rigidly mounted harrow teeth. The device, therefore, is particularly useful in providing a multiple-toothed implement adapted to produce the dust mulch which is so necessary in the conservation of moisture in dry farming, especially in the shallow cultivation of corn.

While in practice, a series of teeth will be adapted to a bar forming part of the frame of a harrow or other implement, such teeth may be adapted to any fixed device or a portion of a frame as well.

Having described my invention, what I claim as new, and desire to secure by Letters Patent, is:

1. A spring tooth for a cultivating implement comprising a straight depending elastic body and a hook-shaped head having a forward offset at the junction with the body and a hook at its rear end formed with a bend at its extremity, whereby the tooth is adapted to detachably engage and lock with a frame bar.

2. The combination with an angle bar having alined V-shaped notches at its front and rear edges and in the intermediate angle, of a spring tooth having a recurved head adapted to embrace the bar, and a front shoulder and rear terminal bend which are adapted to respectively enter and engage the alined notches, and thus lock with said bar.

3. The combination with a bar having V-shaped notches in its edges in the same transverse plane, of a spring-tooth having a depending body and a head bent detachably about said bar to be seated in said notches, and a resilient connection between said body and bar.

4. The combination with a supporting angle-bar, of a spring-tooth having its upper end recurved about the bar to detachably engage both edges and the intermediate exterior angle thereof, said tooth depending from the bar, and a yieldable spring-connection between the depending part of the angle-bar and that part of the depending tooth which lies opposite thereto, one end of the spring-connection being detachably passed through an orifice in the bar and engaged with the opposite side thereof.

Signed at Waterloo, Iowa, this 18th day of April 1913.

DANIEL H. YOUNG.

Witnesses:
G. C. KENNEDY,
W. H. BRUNN.